United States Patent
Kuan et al.

(10) Patent No.: US 12,351,762 B2
(45) Date of Patent: Jul. 8, 2025

(54) HYDROCARBON PYROLYSIS OF FEEDS CONTAINING MERCURY

(71) Applicant: ExxonMobil Chemical Patents Inc., Baytown, TX (US)

(72) Inventors: Keng-Fai Kuan, Singapore (SG); Boon Hwa Sow, Singapore (SG); Rodney S. Smith, Midlothian (GB)

(73) Assignee: ExxonMobil Engineering & Technology Company, Baytown, TX (US)

( * ) Notice: Subject to any disclaimer, the term of this patent is extended or adjusted under 35 U.S.C. 154(b) by 312 days.

(21) Appl. No.: 17/998,166

(22) PCT Filed: Apr. 27, 2021

(86) PCT No.: PCT/US2021/029436
§ 371 (c)(1),
(2) Date: Nov. 8, 2022

(87) PCT Pub. No.: WO2021/242464
PCT Pub. Date: Dec. 2, 2021

(65) Prior Publication Data
US 2023/0220287 A1 Jul. 13, 2023

Related U.S. Application Data

(60) Provisional application No. 63/031,724, filed on May 29, 2020.

(51) Int. Cl.
*C10G 55/08* (2006.01)
*B01D 53/04* (2006.01)
(Continued)

(52) U.S. Cl.
CPC ............. *C10G 55/08* (2013.01); *B01D 53/04* (2013.01); *C10G 7/00* (2013.01); *C10G 9/36* (2013.01);
(Continued)

(58) Field of Classification Search
CPC . C10G 55/08; C10G 7/00; C10G 9/36; C10G 25/12; C10G 31/08; C10G 55/04;
(Continued)

(56) References Cited

U.S. PATENT DOCUMENTS 4,911,825 A * 3/1990 Roussel ................. C10G 45/04
585/843
5,062,948 A 11/1991 Kawazoe et al.
(Continued)

FOREIGN PATENT DOCUMENTS

CN 110527555 12/2019 ............. C10G 55/04

OTHER PUBLICATIONS

Yan, T. Y. (1991) "Reaction of Trace Mercury in Natural Gas with Dilute Polysulfide Solutions in a Packed Column," *Ind. Eng. Chem. Res.*, v.30(12), pp. 2592-2595.

*Primary Examiner* — Randy Boyer
*Assistant Examiner* — Juan C Valencia

(57) ABSTRACT

The invention generally relate to processes, systems, and methods for the pyrolysis of hydrocarbon feeds containing one or more forms of mercury, e.g., the steam cracking of heavy oil, such as crude oil. Effluent from the pyrolysis is processed to remove various forms of mercury produced during the pyrolysis and/or carried over from the hydrocarbon feed.

30 Claims, 1 Drawing Sheet

(51) Int. Cl.
*C10G 7/00* (2006.01)
*C10G 9/36* (2006.01)
*C10G 25/12* (2006.01)
*C10G 31/08* (2006.01)
*C10G 55/04* (2006.01)
*C10G 67/14* (2006.01)
*C10G 70/04* (2006.01)
*C10G 70/06* (2006.01)

(52) U.S. Cl.
CPC ............ *C10G 25/12* (2013.01); *C10G 31/08* (2013.01); *C10G 55/04* (2013.01); *C10G 67/14* (2013.01); *C10G 70/046* (2013.01); *C10G 70/06* (2013.01); *B01D 2257/602* (2013.01); *C10G 2300/1033* (2013.01); *C10G 2300/205* (2013.01)

(58) Field of Classification Search
CPC ...... C10G 67/14; C10G 70/046; C10G 70/06; C10G 2300/1033; C10G 2300/205; C10G 53/16; C10G 69/06; C10G 70/042; B01D 53/04; B01D 2257/602; B01D 3/346
See application file for complete search history.

(56) References Cited

U.S. PATENT DOCUMENTS

| | | |
|---|---|---|
| 5,107,060 A | 4/1992 | Yan |
| 5,202,301 A | 4/1993 | McNamara |
| 5,281,259 A | 1/1994 | Markovs ..................... 95/134 |
| 5,419,884 A | 5/1995 | Weekman et al. ............ 423/210 |
| 5,510,565 A | 4/1996 | Tan et al. ..................... 585/823 |
| 6,303,842 B1 * | 10/2001 | Bridges ................... C10G 9/14 208/309 |
| 6,632,351 B1 | 10/2003 | Ngan et al. ................... 208/132 |
| 7,138,047 B2 | 11/2006 | Stell et al. .................... 208/130 |
| 7,374,664 B2 | 5/2008 | Powers |
| 8,668,887 B2 | 3/2014 | McGarvey et al. .......... 423/210 |
| 8,980,082 B2 | 3/2015 | Kim et al. |
| 9,267,082 B2 | 2/2016 | Braden et al. ....... C10G 25/003 |
| 9,441,172 B2 | 9/2016 | Knickerbocker et al. ................... C10G 45/02 |
| 11,591,529 B2 | 2/2023 | DeLaney et al. |
| 2009/0272671 A1 * | 11/2009 | Keusenkothen ....... C10G 69/06 422/212 |
| 2011/0005975 A1 | 1/2011 | Rudolf et al. |
| 2013/0046122 A1 * | 2/2013 | Vermeiren ............. C10G 9/002 585/251 |
| 2015/0108040 A1 | 4/2015 | Lord et al. ............ C10G 31/06 |
| 2015/0175905 A1 | 6/2015 | Love ..................... C10G 53/02 |
| 2017/0022431 A1 | 1/2017 | Guillou et al. |
| 2019/0225892 A1 * | 7/2019 | Pradeep ................ C10B 57/045 |

* cited by examiner

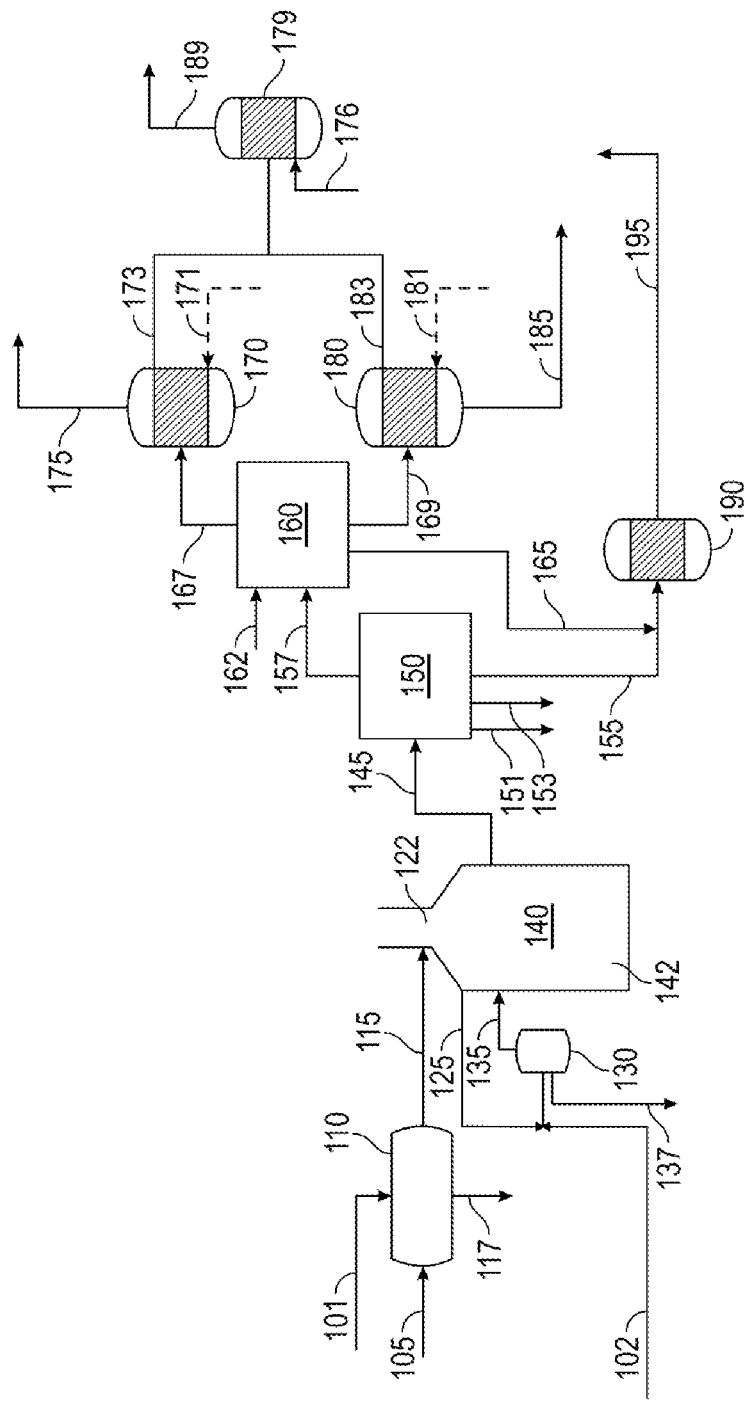

HYDROCARBON PYROLYSIS OF FEEDS CONTAINING MERCURY

CROSS-REFERENCE OF RELATED APPLICATIONS

This application is a US national phase application of PCT Application Serial No. PCT/US2021/029436 having a filing date of Apr. 27, 2021, which claims priority to and the benefit of U.S. Provisional Application No. 63/031,724 having a filing date of May 29, 2020, the disclosures of both of which are incorporated herein by reference in their entireties.

FIELD

Embodiments disclosed herein generally relate to processes, systems, and methods for the pyrolysis of hydrocarbon feeds containing one or more forms of mercury, e.g., the steam cracking of heavy oil, such as crude oil. Effluent from the pyrolysis is processed to remove various forms of mercury produced during the pyrolysis and/or carried over from the hydrocarbon feed.

BACKGROUND

Steam cracking is a process that can convert various types of feeds into olefins that can then be used, for example, as raw material for polymer production. As steam cracking economics becomes more challenging, considerable interest has arisen in the use of lower-cost liquid feeds for steam cracking, particularly feeds containing contaminants. Examples of contaminant-laden feeds ("challenged feeds") proposed for steam cracking include crude oils and streams derived from crude oil, such as gas oils, resids and the like.

Mercury is a particular obstacle to the use of certain challenged feeds for steam cracking. Although some feeds for steam cracking derived from refinery sources can have mercury content of 20 parts per billion by weight (wppb) or less, other feeds, particularly challenged feeds such as crude oils can have mercury contents ranging from less than 1 wppb to more than 1000 wppb. The higher levels of mercury present in the challenged feeds may present a variety of difficulties for a steam cracking environment. Some challenges are related to meeting environmental regulatory requirements, such as maintaining the mercury content in any fuel gas at less than 0.05 mg/Nm$^3$ mercury. Other challenges are related to equipment reliability. For example, the presence of mercury with free water can cause amalgam corrosion in some alloy metals, such as aluminum alloys that may be present in various process elements used for cooling and/or separating the steam cracker effluent. Still other challenges are related to process operation reliability. Mercury is a poison to precious metal catalysts, and can deactivate such catalysts in downstream processes that receive portions of the steam cracker effluent. This can result in unreliable process operation and/or off-specification products. It is therefore desired to develop systems and methods that allow for steam cracking of hydrocarbon feeds containing mercury, particularly challenged feeds such as crude oil and streams derived from crude oil.

U.S. Pat. No. 9,441,172 describes methods for petroleum refinery mercury control. The methods include processing a low sulfur, mercury-containing crude with a higher sulfur crude oil. The processing can be performed under conditions that allow for sufficient conversion of sulfur in the higher sulfur crude to create higher reactivity sulfur species. The higher reactivity sulfur species then react with mercury to form mercury sulfides, which are solids that are easier to remove from the crude oil.

U.S. Patent Application Publication 2015/0108040 describes methods for removing mercury from crude oil using a stabilizer column. Crude oil is heated to a temperature of 100° C. or more in a stabilizer column for a sufficient amount of time to convert various forms of mercury to elemental mercury. The elemental mercury is then stripped from the crude oil by flashing or gas stripping with a gas injected at the bottom of the stabilizer column. The stripping process also removes hydrocarbon light ends from the crude oil.

U.S. Patent Application Publication 2015/0175905 describes a method of desalting. After initially separating crude oil from the rag layer after desalting, the rag layer is separated in a centrifuge to recover additional crude oil and water. The water can then be recycled for further use in desalting.

SUMMARY

In various aspects, processes, system, and methods are provided for steam cracking feeds comprising hydrocarbon and mercury, e.g., a challenged feed. Such feeds include steam cracking feed comprising a crude oil containing mercury as a contaminant and/or a mercury-containing feed that is derived from crude oil, e.g., one or more crude fractions containing mercury. Advantageously, the steam cracking can be carried out using feeds elevated amounts of mercury, such as a mercury content in the feed of 25 parts per billion by weight (wppb) or more. This can facilitate an addition of steam cracking capacity without a need for ancillary facilities, e.g., refining facilities, for removing mercury from the feed before the steam cracking.

Accordingly, certain aspects of the invention relate to processes for steam cracking a hydrocarbon feed comprising hydrocarbon and mercury. The steam cracking can be carried out in a steam cracking plant that includes a furnace facility and a recovery facility. The furnace facility includes at least one steam cracking furnace having a convection section and a radiant section. The hydrocarbon feed is provided to the furnace facility, where it is preheated and combined with steam in the convection section to produce a steam cracker feed. Optionally, the steam cracker feed is upgraded further to produce a pyrolysis feed. The steam cracker feed or the pyrolysis feed (as the case may be) is conducted to the radiant section for pyrolysis (cracking). A steam cracker effluent is conducted away from the furnace facility to a recovery facility for recovery from the steam cracker effluent of various products, byproducts, and co-products. Products recovered in the recovery section include (i) relatively-heavy products such as steam cracker tar ("SCT") and/or steam cracker gas oil ("SCGO"), (ii) naphtha boiling range products such as steam cracker naphtha (also referred to as "pyrolysis gasoline" or "naphtha"), and (iii) a process fluid having an a normal boiling point range that is less than that of naphtha, but generally with some overlap, typically comprising a process gas and/or a process liquid. The invention is based in part on the discovery of the various separation, reaction, and recovery pathways effecting the various forms of mercury in in the hydrocarbon feed, and the distribution of various forms of mercury in the indicated products. The discovery of these pathways has led to the development of steam cracking processes described herein in which process features can be pre-selected based on the amounts of each of the various forms of mercury present in the hydrocarbon feed.

Methods are provided for performing steam cracking on a hydrocarbon feed with elevated mercury content. The method can include desalting of the hydrocarbon feed, preheating of the desalted feed, separation of certain high-boiling components and/or non-volatile (involatile) components from the preheated feed to produce a pyrolysis feed, and steam cracking of the pyrolysis feed. In the resulting steam cracker effluent, the mercury content of the heavier portions of the effluent is found to be sufficiently small for the relatively-heavy products to be conducted away for conventional use without a need for mercury removal. Mercury removal can be performed on naphtha and/or process fluid, and/or on streams derived therefrom. For the naphtha, mercury removal can be performed by one or more of hydroprocessing, passing the fraction(s) through a mercury trap, or any other convenient method. For the process fluid, which include desirable $C_2$-$C_6$ olefins, mercury removal can be carried out by one or more of passing the process fluid through one or more mercury traps, treating at least a portion of the process fluid with polysulfide, or any other convenient method.

Other aspects of the invention relate to the conversion by the steam cracking of various forms of mercury to elemental mercury and/or mercury-containing compounds. It has been discovered that for a very broad range of hydrocarbon feeds, the amount of elemental mercury and/or mercury-containing compounds carried into the naphtha depends mainly on the total amount of mercury in the hydrocarbon feed, and not appreciably on the relative amounts of the various forms of mercury in the hydrocarbon feed. Thus, a hydrocarbon feed can be analyzed to determine the total amount of the various forms of mercury in the hydrocarbon feed. A naphtha comprising hydrocarbon and predetermined amount of mercury is obtained from the steam cracker effluent by carrying out one or more separations. The predetermined amount of mercury in the naphtha is determined from the total amount of mercury in the hydrocarbon feed, e.g., by calculation. At least a portion of the naphtha is hydroprocessed in at least one hydroprocessing reactor. The hydroprocessing reactor contains first and second predetermined amounts of hydroprocessing catalyst. The first predetermined amount of hydroprocessing catalyst removes a sufficient amount of mercury from the naphtha to substantially prevent mercury poisoning of the second predetermined amount of catalyst. The second predetermined amount of hydroprocessing catalyst is sufficient for carrying out the naphtha hydroprocessing. The first and second predetermined amounts are obtained from the predetermined amount of mercury in the naphtha, e.g., by calculation. Thus for a broad range of hydrocarbon feeds and a broad range of steam cracking conditions, an accurate predetermination of the first and second amounts of hydroprocessing catalyst can be determined from the total amount of mercury in the hydrocarbon feed.

BRIEF DESCRIPTION OF THE DRAWINGS

The FIGURE shows an example of a process configuration for performing steam cracking.

DETAILED DESCRIPTION

In various aspects, processes, systems and methods are provided for the pyrolysis of hydrocarbon feeds containing mercury. Transforming at least a portion of the various forms of mercury present in the hydrocarbon feed to other forms (generally easier to remove forms) of mercury in the effluent from the pyrolysis is within the scope of the invention. Separating streams from the hydrocarbon feed and from the pyrolysis effluent is also within the scope of the invention, as processes, systems, and methods for removing various forms of mercury from these streams. In certain aspects, the pyrolysis is or includes steam cracking, and the hydrocarbon feed is or includes one or more heavy oils, such as one or more crude oils.

Mercury content has been an obstacle to processing whole or partial crude oil (e.g., a fraction of a crude oil) fractions in a steam cracker. Instead of using a feed that is previously processed by a refinery, certain aspects of the invention pertain to steam cracking a crude or crude fraction having an appreciable mercury content, such as a mercury content of 25 wppb or more. Such crude oils or crude oil fractions would conventionally be considered as too high in mercury content for use in a steam cracker process train. In accordance with the invention, such crude oils or crude oil fractions now can used as feeds for steam cracking while complying with regulatory requirements and lessening or minimizing corrosion and/or downstream catalyst poisoning issues.

The invention is based in part on the discovery of the ways various forms of mercury can be processed and removed within steam cracker process train, which in turn is based on the discovery of the ways pyrolysis and pretreatments carried out before the pyrolysis removes and/or transforms those forms of mercury as are present in the hydrocarbon feed. Based on these discoveries, processes, systems, and methods are provided for processing of hydrocarbon feeds containing an appreciable amount of various forms of mercury, e.g., crude oils or crude fractions having a mercury content of 25 wppb or more, or 100 wppb or more, or 250 wppb or more, such as up to 1500 wppb or possibly still higher. The steam cracking of a crude oil or crude fraction that has not been previously processed in one or more refining processes, e.g., fractionation with reflux at a refining facility co-located with the steam cracking furnace, is within the scope of the invention. Additionally or alternately, the crude oil or crude fraction can correspond to a raw crude oil or crude fraction. In addition to crude oils and/or crude fractions, other fractions can also be included in the feed, so long as the total feed has a mercury content of 25 wppb or more. Examples of other feeds for steam cracking can correspond to various types of vapor and/or liquid hydrocarbon feed. Examples of suitable feeds can include whole and partial crudes, light alkane feeds (e.g., ethane, propane, butane), naphtha boiling feeds, distillate boiling range feeds, resid boiling range feeds (atmospheric or vacuum), or combinations thereof.

In certain aspects, the mercury removal can include performing an initial desalting of the hydrocarbon feed; performing an initial liquid-vapor separation; conversion of various types of mercury to elemental mercury in the steam cracker; and using one or more types of fixed bed and/or regenerable bed mercury traps on effluents from the primary fractionator.

One of the concerns with using high mercury content feeds in steam cracking is that removal of the mercury from the steam cracker effluent would result in substantial additional equipment cost and/or reduced cycle length for the adsorbent beds between regeneration cycles. It has been discovered, however, that by performing an initial desalting on a feed for steam cracking, a substantial portion of the mercury can be removed. It has further been discovered that an additional portion of mercury can be removed in an initial separation (flash separation or other boiling point-based separation) prior to steam cracking. Based on these initial mercury removals, the content of mercury passed into the steam cracking reactor can be sufficiently reduced so that subsequent removal of mercury from the steam cracker effluent can be performed with reduced or minimized cost and/or loss of cycle length.

It is to be understood that the following disclosure describes several exemplary embodiments for implementing different features, structures, and/or functions of the invention. Exemplary embodiments of components, arrangements, and configurations are described below to simplify the present disclosure; however, these exemplary embodiments are provided merely as examples and are not intended to limit the scope of the invention. The exemplary embodiments presented below can be combined in any combination of ways, i.e., any element from one exemplary embodiment can be used in any other exemplary embodiment, without departing from the scope of the disclosure. All numerical values within the detailed description and the claims herein are modified by "about" or "approximately" the indicated value, and take into account experimental error and variations that would be expected by a person having ordinary skill in the art. For the purpose of this description and appended claims, the following terms are defined.

"Hydrocarbon" means a class of compounds containing hydrogen bound to carbon. The term "$C_n$" hydrocarbon means hydrocarbon having n carbon atom(s) per molecule, where n is a positive integer. The term "$C_{n+}$" hydrocarbon means hydrocarbon having at least n carbon atom(s) per molecule, where n is a positive integer. The term "$C_{n-}$" hydrocarbon means hydrocarbon having no more than n number of carbon atom(s) per molecule, where n is a positive integer. "Hydrocarbon" encompasses (i) saturated hydrocarbon, (ii) unsaturated hydrocarbon, and (iii) mixtures of hydrocarbons, including mixtures of hydrocarbon compounds (saturated and/or unsaturated), including mixtures of hydrocarbon compounds having different values of n.

"Heavy hydrocarbon" means a mixture comprising hydrocarbon, the mixture having an API gravity in the range of from 5° up to (but not including) 22°. "Medium hydrocarbon" means a mixture comprising hydrocarbon, the mixture having an API gravity in the range of from 22° to 30°. A "relatively-heavy" hydrocarbon has an API gravity that is less than that of naphtha.

The term "unsaturate" or "unsaturated hydrocarbon" means a $C_{2+}$ hydrocarbon containing at least one carbon atom directly bound to another carbon atom by a double or triple bond. The term "olefin" means an unsaturated hydrocarbon containing at least one carbon atom directly bound to another carbon atom by a double bond. In other words, an olefin is a compound which contains at least one pair of carbon atoms, where the first and second carbon atoms of the pair are directly linked by a double bond. "Light olefin" means $C_{5-}$ olefinic hydrocarbon.

"Primarily liquid phase" means a composition of which ≥50 wt. % is in the liquid phase, e.g., ≥75 wt. %, such as ≥90 wt. %. A hydrocarbon feedstock is a primarily liquid-phase hydrocarbon feedstock when ≥50 wt. % of the hydrocarbon feedstock is in the liquid phase at a temperature of 25° C. and a pressure of 1 bar absolute, e.g., ≥75 wt. %, such as ≥90 wt. %.

"Raw" feedstock, e.g., raw hydrocarbon feedstock, means a primarily liquid-phase feedstock that comprises ≥25 wt. % of crude oil that has not been subjected to prior desalting and/or prior fractionation with reflux, e.g., ≥50 wt. %, such as ≥75 wt. %, or ≥90 wt. %.

"Crude oil" means a mixture comprising naturally-occurring hydrocarbon of geological origin, where the mixture (i) comprises ≥1 wt. % of resid, e.g., ≥5 wt. %, such as ≥10 wt. %, and (ii) has an API gravity ≤52°, e.g., ≤30°, such as ≤20°, or ≤10°, or ≤8°. The crude oil can be classified by API gravity, e.g., heavy crude oil has an API gravity in the range of from 5° up to (but not including) 22°.

Normal (or "atmospheric") boiling point and normal boiling point ranges can be measured by gas chromatograph distillation according to the methods described in ASTM D-6352-98 or D2887, as extended by extrapolation for materials above 700° C. Steam cracker naphtha, or "naphtha", is a mixture of $C_{5+}$ hydrocarbons, e.g., $C_5$-$C_{10+}$ hydrocarbons, having an initial atmospheric boiling point of about 25° C. to about 50° C. and a final boiling point of about 220° C. to about 265° C., as measured according to ASTM D2887-18. In some examples, the naphtha can have an initial atmospheric boiling point of about 33° C. to about 43° C. and a final atmospheric boiling point of about 234° C. to about 244° C., as measured by ASTM D2887-18.

The invention relates to processing hydrocarbon feeds containing mercury. A hydrocarbon feed, e.g., a $C_{5+}$ hydrocarbon, such as one that is primarily in the liquid phase at a temperature of 25° C. and a pressure of 1 bar (absolute), can be mixed, blended, combined, or otherwise contacted with an aqueous composition comprising water, steam, or a mixture thereof to produce a steam cracking feed. The hydrocarbon feed can be heated before and/or after it is combined with the aqueous composition. A primarily vapor phase pyrolysis feed and a liquid phase product can be separated from the steam cracking feed. The pyrolysis feed can be heated and subjected to steam cracking conditions to produce a steam cracker effluent. The steam cracker effluent can be cooled to produce a cooled steam cracker effluent. For example, the steam cracker effluent can be directly contacted with a quench fluid and/or indirectly cooled via one or more heat exchangers, e.g., a transfer line exchanger ("TLE"), to produce a cooled steam cracker effluent. Products that can be separated from the cooled steam cracker effluent include a process fluid (which typically comprises light olefin such as ethylene, propylene, and butenes), and steam cracker naphtha, also referred to as naphtha or pyrolysis gasoline.

Certain hydrocarbon feeds will now be described in more detail. The invention is not limited to these hydrocarbon feeds, and this description should not be interpreted as foreclosing other hydrocarbon feeds within the broader scope of the invention.

Hydrocarbon Feeds

In certain aspects, the hydrocarbon feed comprises hydrocarbon and mercury material. Those skilled in the art will appreciate that the term "hydrocarbon feed" is a convenient label, but does not mean that the feed contains hydrocarbon only. Although at least a portion of the hydrocarbon feed's mercury material can be added to the hydrocarbon feed, it is typical for most or even all of the mercury material to be present in the feed at the feed's source. For example, the mercury material in the hydrocarbon feed can be mercury material that is naturally present in certain heavy hydrocarbons, such as mercury material that is naturally present in crude oil. In these and other aspects, the hydrocarbon can have a nominal final boiling point of about 315° C. or greater, such as about 400° C. or greater, about 450° C. or greater, or about 500° C. or greater. In some aspects, they hydrocarbon feed contains a relatively small amount of naphtha or light ends. For example, the hydrocarbon feed can include 70 wt. % or more of components having a boiling point of 150° C. or more, or 80 wt. % or more, or 90 wt. % or more, such as up to having substantially all components boil at 150° C. or more.

In certain aspects, the feed's hydrocarbon can be relatively-high molecular weight hydrocarbon, e.g., a heavy hydrocarbon, such as those which pyrolyse to produce a relatively large amount of steam cracker naphtha (also called pyrolysis gasoline), steam cracker gas oil ("SCGO"), and SCT during steam cracking. The heavy hydrocarbon may include one or more of resids (also called residual oil or residues), gas oils, crude oil, atmospheric pipestill bottoms, vacuum pipestill streams including bottoms, condensates, heavy non-virgin hydrocarbon streams from refineries, vacuum gas oils, heavy gas oil, naphtha contaminated with crude, atmospheric residue, heavy residue, $C_4$/residue admixture, naphtha residue admixture, gas oil residue admixture, low sulfur waxy residue, atmospheric residue, and heavy residue.

In certain aspects, the hydrocarbon feed includes economically-advantaged, minimally-processed heavy hydrocarbon containing non-volatile components and coke precursors. For example, the hydrocarbon feed can include about 1 wt. % or more of heavy hydrocarbon, based on the weight of the hydrocarbon feed, such as about 25 wt. % or more, about 50 wt. % or more, about 75 wt. % or more, about 90 wt. % or more, or about 99 wt. % or more. The hydrocarbon feed can comprise, consist of, or consist essentially of one or more raw feeds, such as one or more crude oils.

In certain aspects, the hydrocarbon feed further comprises relatively-low molecular weight hydrocarbon (e.g., medium and/or light hydrocarbon), such as one or more of heating oil, jet fuel, diesel, kerosene, coker naphtha, hydrocrackate, reformate, raffinate reformate, distillate, naphtha boiling-range hydrocarbon and substantially saturated hydrocarbon molecules having fewer than five carbon atoms, e.g., ethane, propane, and mixtures thereof. Although hydrocarbon feedstocks comprising light hydrocarbon typically produce a greater yield of $C_2$ unsaturates than do those comprising heavy hydrocarbon, heavy hydrocarbon is of increasing interest due to lower costs and higher availability.

The hydrocarbon feed contains mercury material. For example, the hydrocarbon feed can include one or more of mercury, mercury-containing compounds, and compositions comprising mercury and/or mercury-containing compounds. Such mercury-containing compounds include inorganic mercury compounds and/or organo-mercury compounds. Illustrative inorganic mercury compounds can be or include elemental mercury, one or more sulfides of mercury, one or more sulfates of mercury, one or more mercury halides, and one or more mercury mercaptides. Illustrative organo-mercury compounds can be or include one or more of methyl mercury, one or more compounds having the chemical formula $R_1$—Hg—X, and one or more compounds having the chemical formula $R_1$—Hg—$R_2$, where $R_1$ and $R_2$ are each an alkyl, alkenyl, or aryl group, or a combination thereof, and X is halogen. $R_1$ and $R_2$ can be the same or different. The mercury material can be natural and/or synthetic. The hydrocarbon feed can have a mercury content in a range of from 0.5 wppb to 6000 wppb, e.g., 1 wppb to 1000 wppb, such as 10 wppb to 250 wppb, or 25 wppb to 100 wppb.

Steam Cracking Process Flow with Mercury Removal

The following process flow corresponds to a process flow that is suitable for processing hydrocarbon feeds containing mercury, including hydrocarbon feeds that have not been previously processed in a refinery, such as a co-located refinery. A co-located refinery is one that can transfer a hydrocarbon fraction that has been processed in a refinery process flow configuration to the steam cracker via dedicated piping. Dedicated piping is in contrast to transport of hydrocarbon fractions through a common pipeline, transport via ship, transport via train, and/or transport via truck. For the purpose of this description and appended claims, a hydrocarbon feed (e.g., a crude oil or crude fraction) that has been previously processed in a refinery means a crude oil that was processed in a refinery (different from the facility containing the steam cracker) after transport via a common pipeline, ship, or truck, or train.

When the hydrocarbon feed is processed as a feed in a steam cracking processing train without prior processing in a refinery, the mercury species in the a hydrocarbon feed (e.g., a crude oil or crude fraction) can correspond to a mixture of mercury sulfides, other mercury salts, and elemental mercury. Prior to passing the hydrocarbon feed through the radiant section of the steam cracking reactor, it has been discovered that processing steps (such as desalting) that can remove other types of salts may also be able to remove a portion of the mercury in the hydrocarbon feed. After desalting, any remaining mercury sulfides or other mercury salts are converted to elemental mercury by the pyrolysis.

During desalting, a hydrocarbon feed is sufficiently mixed with water to allow the wash water to intimately contact salt-containing water droplets in the feed. An electrostatic separation is then performed to remove a water phase including desalter sludge from the feed. The desalted feed can then be passed into subsequent processes, e.g., to a steam cracking furnace for steam cracking. It has been discovered that roughly 20 wt. % to 80 wt. % of the mercury (as present in its various forms) in the hydrocarbon feed can be removed, and conducted away with the desalter sludge. This level of removal of mercury material is sufficient to allow for processing in combination with the other process elements described herein of hydrocarbon feeds having an appreciable mercury content, e.g., high-mercury crude oil. In some aspects, the amount of mercury in the desalted feed can be 5 wppb to 500 wppb, or 5 wppb to 100 wppb, or 25 wppb to 500 wppb, or 25 wppb to 100 wppb, or 25 wppb to 250 wppb, or 50 wppb to 500 wppb, or 50 wppb to 250 wppb.

Any convenient type of desalter configuration and/or desalter process can be used. It is noted that removing mercury material in a desalter can be enhanced using certain additives, e.g., those that aid in chemically removing one or more mercury material. That said, the invention is advantageous in that the desalting can be carried out using water-only, without a need for additives. Avoiding a need for additives during desalting decreases operating costs, and lessens the risk of an additive adversely effecting operations downstream of the desalter and/or product quality.

Desalting can be performed at a temperature in a range of from 50° C. to 150° C. After desalting, the desalted feed is typically preheated (e.g., in the steam cracking furnace's convection section), mixed with dilution steam (which also heats the feed), and typically further preheated to a temperature at which significant thermal cracking (steam cracking) can commence, such as a temperature in a range of from 600° C. to 700° C. The amount of dilution steam added to the feed prior to cracking can correspond to 10 vol. % to 50 vol. % of the total flow into the radiant section of the steam cracking furnace.

In aspects where the hydrocarbon feed is a heavy hydrocarbon feed, such as crude oil, a first heating (typically called a preheating) of the desalted feed can be used to prepare the desalted feed for a vapor-liquid separation. Although the preheating can be carried out in a steam cracking furnace, the invention is not limited thereto. In certain aspects where preheating is carried out, the desalted feed is conducted into convection coils located in the steam cracking furnace's convection section. The desalted feed can be heated in the convection section to a desired temperature prior to transferring the preheated feed out of the steam cracking furnace to a separation stage that includes one or more vapor-liquid separators. During the preheating, roughly 20 wt. % to 50 wt. % of mercury (in its various forms) in the desalted feed typically deposits on internal surfaces (e.g., of the convection coils and other piping) in the convection section. The resulting preheated feed can have a mercury content in a range of from 1 wppb to 400 wppb, or 1 wppb to 100 wppb, or 25 wppb to 400 wppb, or 25 wppb to 100 wppb, or 25 wppb to 250 wppb, or 50 wppb to 400 wppb, or 50 wppb to 250 wppb.

In aspects where the pyrolysis includes steam cracking, the preheated feed can then be combined with the dilution steam to produce a steam cracking feed that can be passed to a vapor-liquid separator. At least a portion of the steam cracking feed is in the vapor phase when it enters the vapor-liquid separator. A primarily vapor-phase pyrolysis feed and a primarily liquid phase bottoms stream are separated from the steam cracking feed in the vapor-liquid separator. The pyrolysis feed can be returned to the convection section for additional preheating in convection coils that are typically located in a lower region of the convection section. A resulting preheated pyrolysis feed is then passed via cross-over piping into radiant coils located in the radiant section of the steam cracking furnace.

Use of the vapor-liquid separator can be advantageous to lessen or minimize fouling in the radiant coils, e.g., when the hydrocarbon feed includes heavy hydrocarbon such as crude oil. The separation can be performed to control the amount of non-volatiles in the pyrolysis feed, typically by controlling the cut point of the vapor-liquid separator. Doing so decreases the amount of non-volatiles in the pyrolysis feed that would otherwise cause fouling in the radiant coils, e.g., non-volatiles having a boiling point of greater than 1100° F. (593° C.), or greater than 1400° F. (760° C.).

In some aspects, the pyrolysis feed can roughly correspond to a fraction of the steam cracking feed having a final boiling point roughly 1400° F. (760° C.) or less, or 1100° F. (593° C.) or less, or 1050° F. (566° C.) or less. Additionally or alternately, the pyrolysis feed can contain less than 400 wppm of non-volatiles, or less than 100 wppm, or less than 80 wppm, or less than 50 wppm. In some aspects, the vapor-liquid separation includes a flash separation and/or a distillation.

It has been discovered that a portion of the mercury material in the steam cracking feed can be removed with the primarily-liquid bottoms stream conducted away from the vapor-liquid separator, such as up to 20 wt. % of the mercury (in its various forms) in the steam cracking feed. In some aspects, the pyrolysis feed can have a mercury content of 1 wppb to 350 wppb, or 1 wppb to 100 wppb, or 25 wppb to 350 wppb, or 25 wppb to 100 wppb.

The pyrolysis feed is passed via cross-over piping to the radiant coils for steam cracking to produce steam cracking products such as olefins. In the radiant or cracking zone of a steam cracking furnace, the pyrolysis feed is rapidly heated to high temperatures, such as 750° C. to 850° C., or 800° C. to 850° C., to produce a mixture of desired products. The residence time of the feed in the radiant or cracking zone is typically in a range of from 0.1 seconds to 0.3 seconds. Pressure at the outlet of the radiant coils is typically in a range of from 100 kPa-g to 180 kPa-g. Under such operating conditions, substantially all mercury material in the pyrolysis feed is converted to elemental mercury. The conversion of mercury species to elemental mercury can facilitate removal of the remaining mercury at various locations downstream of the steam cracker furnace.

After steam cracking of the feed, various streams can be separated from the resulting steam cracker effluent. This can include a steam cracker tar fraction, one or more steam cracker gas oil fractions, one or more naphtha fractions, and a process fluid comprising saturated and unsaturated $C_1$-$C_6$ hydrocarbon as well as other low-boiling components (such as $H_2S$). Light ($C_2$-$C_6$) olefin are a desired product of the steam cracking process. It is observed for a wide range of hydrocarbon feeds, in particular for a wide range of hydrocarbon feeds comprising crude oils, the amount of $C_{4-}$ hydrocarbon in the steam cracker effluent is typically in a range of from 40 wt. % to 65 wt. % based on the weight of the steam cracker effluent.

An initial separation or sequence of separations can be used to separate from the steam cracker effluent one or more of steam cracker tar, steam cracker gas oil, naphtha, and the process fluid. The separation(s) can be performed, for example, using a tar knock-out drum, primary fractionator, quench tower, or combination thereof. For example, fractionator tower overhead can then be passed through a quench tower for disengaging naphtha, water, and the process fluid. The resulting naphtha and process fluid can then be further processed, e.g., to remove mercury material. It is noted that the amount of mercury material in the steam cracker gas oil and other heavier fractions can be relatively low, and therefore additional mercury removal from such heavier fractions is typically unnecessary. It is observed for a wide range of hydrocarbon feeds, in particular for a wide range of hydrocarbon feeds comprising crude oils, that the combined amount of steam cracker gas oil and steam cracker tar is typically in a range of about 10 wt. % to 20 wt. % based on the weight of the steam cracker effluent.

It is also observed for a wide range of hydrocarbon feeds, in particular for a wide range of hydrocarbon feeds comprising crude oils, that typically 30 wt. % to 60 wt. % of mercury material present in the steam cracker effluent resides in the separated naphtha. Typically, the amount of naphtha ($C_5$ to $C_9$) in the steam cracker effluent is in a range of from 20 wt. % to 30 wt. % based on the weight of the steam cracker effluent. The mercury concentration in the naphtha is typically in a range of from 1 wppb to 350 wppb, or 1 wppb to 100 wppb, or 25 wppb to 350 wppb, or 25 wppb to 100 wppb. Certain aspects of the invention relate to decreasing the amount of mercury material in the naphtha to lessen or minimize deactivation that can occur, e.g., during naphtha hydroprocessing.

Certain forms of naphtha processing will now be described in more detail. The invention is not limited to these forms, and this description should not be interpreted as foreclosing other forms of naphtha processing within the broader scope of the invention.

Naphtha Processing

In certain aspects the naphtha separated from the steam cracker effluent in one or more separations is hydroprocessed to produce hydroprocessed (stabilized) naphtha product. For example, the naphtha can be hydroprocessed in the presence of molecular hydrogen and one or more catalysts to produce the hydroprocessed naphtha, which can also be referred to as stabilized naphtha. Hydroprocessing the naphtha can hydrogenate at least a portion of any diolefins to monoolefins present in the naphtha and/or convert at least a portion of any olefins to paraffins, and/or convert at least a portion of any sulfur compounds to hydrogen sulfide that can be present in the naphtha. In some examples, a motor gasoline ("mogas") blendstock can be produced. Mogas blendstock is a mixture that includes $C_4$-$C_{12}$ hydrocarbons having an initial atmospheric boiling point of about 35° C. and a final boiling point of about 200° C. The mogas blendstock can include the stabilized naphtha.

It has been surprisingly and unexpectedly discovered that when the hydrocarbon feed contains mercury material, hydroprocessing the naphtha to produce the hydroprocessed naphtha can be the limiting factor with regard to how long of a period of time the steam cracking can be operated before a shutdown or turndown of the steam cracker is needed. More particularly, it has been discovered that the one or more catalysts used in the hydroprocessing of naphtha can become deactivated, degraded, poisoned, or otherwise rendered insufficiently effective (collectively, "deactivated") as a result of the naphtha's mercury content before other aspects of the process are rendered ineffective. It has been found that the deactivation mainly results from the mercury material in the hydrocarbon feed subjected to steam cracking and from mercury material derived from that present in the hydrocarbon feed. Accordingly, a process and system for steam cracking a hydrocarbon feed containing mercury material can be configured to run for a predetermined period of time before requiring a shutdown or turndown resulting from catalyst deactivation.

Certain aspects of the invention include removing elemental mercury from the naphtha using one or more fixed bed mercury traps. Conventional fixed-bed mercury traps can be used, but the invention is not limited thereto. Suitable fixed bed mercury traps include fixed beds of carrier particles (such as alumina particles) that are impregnated with sulfur and/or metal sulfides. This type of fixed bed mercury trap can be effective for removal of substantially all mercury material present in a naphtha fraction until the adsorption capacity of the sulfide and/or metal sulfide is reached. Suitable fixed bed mercury traps also include those that contain charcoal particles that have a sulfur content. The charcoal can be effective for mercury removal from naphtha fractions with sufficiently low moisture content. The substantially mercury-free naphtha fraction, having a mercury content of 0.1 wppb or less, can then be hydroprocessed without significant catalyst deactivation.

Additionally or alternately, the number of hydroprocessing catalyst bed(s) and/or the amount of hydroprocessing catalyst in the beds in the naphtha hydroprocessing) stages can be increased relative to the expected volume of the naphtha and the naphtha's mercury content. For example, the hydroprocessing reactor can contain two hydroprocessing catalysts, an amount $A_2$ of a first hydroprocessing catalyst and an amount $A_3$ of a second hydroprocessing catalyst. The first and second catalyst can have the same composition, but this is not required. The amount $A_2$ of the first hydroprocessing catalyst is the amount that is effective for removing mercury from the naphtha under the naphtha hydroprocessing conditions. Amount $A_3$ of the second hydroprocessing catalyst is the catalytically effective amount of the second catalyst needed for hydroprocessing the naphtha under the hydroprocessing conditions. Those skilled in the art will appreciate that since (i) there are numerous conventional methods for determining naphtha yield for a wide variety of hydrocarbon feeds, e.g., using SPYRO software available from Technip, and (ii) approximately typically 30 wt. % to 60 wt. % of mercury (in its various forms), approximate values for $A_2$ and $A_3$ can be determined from $A_1$. For a broad range of hydrocarbon feeds, e.g., a broad range of crude oil feeds, and for a broad range of steam cracking conditions, approximate values for $A_2$ and $A_3$ can be obtained solely from $A_1$. The first and second catalysts are typically located in the same bed or beds in the hydroprocessing reactor, e.g., as a mixture of first and second catalyst. Alternatively, the first catalyst can be in one or more beds located upstream and/or downstream of one or more beds of the second catalyst, but typically upstream.

The amount $A_2$ of the second catalyst can be selected to provide a large processing margin. These aspects of the invention are based in part on the discovery that elemental mercury present in the naphtha fraction is readily adsorbed by various types of hydroprocessing catalysts under hydroprocessing conditions, and can produce a hydrotreated effluent having a mercury concentration of 0.1 wppb or less. Examples of hydroprocessing catalysts include demetallization catalysts, hydrotreating catalysts, and aromatic saturation catalysts. Such hydroprocessing catalysts typically include one or more metal sulfdies supported on refractory oxide support particles, such as alumina, silica, or titania particles. Conventional hydroprocessing catalysts can be used, but the invention is not limited thereto.

As mercury is adsorbed by the first hydroprocessing catalyst, the first catalyst will deactivate, but doing so has been found to substantially protect the second catalyst from deactivation. In other words, by using an excess of hydroprocessing catalyst, the hydroprocessing reactor can retain sufficient catalytic activity in the second catalyst for processing of the naphtha even after the first catalyst is deactivated. It is noted that the naphtha fraction can also include other contaminants that cause catalyst deactivation, such as arsenic and silicon. Such additional contaminants can also be adsorbed by the excess catalyst in the hydroprocessing stage. Thus, using an excess of catalyst can mitigate the impact of catalyst deactivation based on a variety of potential contaminants. Due to the low incremental cost of increasing the amount of hydroprocessing catalyst in the naphtha hydroprocessing stage (e.g., by including the second catalyst), using a predetermined amount $A_2$ of the first hydroprocessing catalyst and a predetermined amount $A_3$ of the second an excess of catalyst is found to be effective for both mercury removal and catalytic hydroprocessing of the naphtha for a predetermined time.

The predetermined period of time for which the steam cracking process can be configured to run can be any desired length of time, so long as the hydroprocessing reactor has sufficient capacity for the predetermined amount of hydroprocessing catalyst(s). In some examples, the predetermined period of time can be about 1 day, about 2 days, or about 3 days to about 1 month, about 6 months, about 1 year, about 1.5 years, about 2 years, about 3 years, or about 4 years. In some examples, the predetermined period of time can be based, at least in part, on a desired volume of the hydrocarbon feed that that is conducted to the steam cracker for steam cracking during the predetermined period of time. Certain aspects of the invention include predetermining this time by estimating, measuring, or otherwise determining the amount of mercury $A_1$ in the hydrocarbon feed, based on the weight of the hydrocarbon feed, i.e., the amount of mercury present in its various forms in the hydrocarbon feed (e.g., the total mass in grams of all forms of mercury present in a given mass of the hydrocarbon feed).

Since the process is effective for a wide variety of hydrocarbon feeds and a wide variety of steam cracking conditions, it is within the scope of the invention to change from one hydrocarbon feed to another (e.g., from one crude oil to another) during the predetermined time. Advantageously, this change can be carried out without the need for appreciable changes to the steam cracking process conditions prevailing in the radiant coils.

Besides naphtha processing, the invention also relates to processing other streams that may be separated from the steam cracker effluent in one or more separations, e.g., the process fluid. Certain forms of process fluid processing will now be described in more detail. The invention is not limited to these forms, and this description should not be interpreted as foreclosing other forms of process fluid processing within the broader scope of the invention.

Process Fluid Processing

After exiting from the fractionator and/or quench tower, the process fluid can be passed to one or more stages of compression to produce a compressed process fluid. The compressed process fluid is conducted to one or more acid-gas removal stages (typically one or more amine towers and/or one or more caustic towers) to remove from the compressed process fluid at least a portion of any acidic gases such as $CO_2$ and/or $H_2S$ to produce a purified process fluid. Alternatively, the amine tower(s) and/or caustic towers can be located between one or more of the stages of the compressor. Since the purified process fluid conducted away from the amine tower typically has a lesser pressure than desirable for further processing, at least one additional stage of compression is typically used downstream of amine treatment to facilitate performing further separations.

In certain aspects, mercury is removed from the compressed process fluid by contacting it with a polysulfide solution, e.g., a polysulfide solution that is introduced into the amine tower and/or caustic tower. Alternatively or in addition, elemental sulfur can be introduced to cause in-situ formation of polysulfide ions, as described in U.S. Pat. No. 8,668,887. The polysulfide reacts with elemental mercury to form an insoluble mercury sulfide. At least a portion of the mercury sulfide can be removed via filtration, typically with a mercury removal efficiency of 90% or more.

The steam cracking plant's recovery facility typically includes stages for separating a process gas and a process liquid from the process fluid, e.g., by condensing and separating the process liquid from a process fluid that is primarily vapor-phase. Although there can be some compositional overlap, the process gas typically comprises saturated and unsaturated $C_1$-$C_4$ hydrocarbon (e.g., ethylene, propylene, and butylenes), molecular hydrogen, and certain impurities such as water; and the process liquid typically comprises saturated and unsaturated $C_{5+}$ hydrocarbon (e.g., naphtha), and certain impurities such as water, thiophenic sulfur, and mercaptans.

Water is removed from the process gas and process liquid streams, e.g., by way of one or more stages of moisture-removal (i.e., drying), typically in one or more process gas and process liquid dryers. The dryers can include one or more conventional drying agents, such as commercially available 3A molecular sieves, but the invention is not limited thereto. In some aspects, mercury removal can be included as part of the drying stage by loading one or more regenerable mercury removal molecular sieves into the drying stage. Conventional regenerable mercury removal molecular sieves can be used, e.g., HgSiv as described in U.S. Pat. No. 5,281,259 or U.S. Pat. No. 5,419,884, but the invention is not limited thereto. Addition of a regenerable mercury removal molecular sieve in the process gas and liquid driers can achieve a mercury concentration of 0.1 wppb or less in the upgraded process gas and upgraded process liquid streams conducted away from the dryers and/or mercury-removal stages. These upgraded process gas and upgraded process liquid streams are typically further processed in additional fractionation and hydroprocessing stages.

A plurality of drying/mercury-removal stages can be used in aspects having one or more regenerable mercury removal molecular sieves. In these and other aspects, one or more drying stages can be in service for drying and/or mercury removal while one or more additional stages are in a regeneration mode. Regeneration of the mercury removal molecular sieves can be performed using a thermal regeneration process. For example, a regeneration gas at a temperature of 200° C. or more can be used to remove the trapped mercury in the regenerable molecular sieves. A suitable regeneration gas can be a recycled tail gas that is separated from the process gas. Such a tail gas can include, for example, methane and molecular hydrogen. The molecular sieve can release the mercury into the tail gas. Such a tail gas (or other regeneration gas) can include 0.1 wppm to 50 wppm of mercury, or 0.5 wppm to 50 wppm. By capturing the mercury in a molecular sieve and then releasing it into a tail gas, the volume of gas that needs to be subsequently passed into a fixed bed mercury trap can be substantially decreased. This can lessen equipment footprint and cost. An example of a suitable fixed bed mercury trap can be a sulfur-impregnated activated carbon bed. The fixed bed mercury trap can reduce the mercury content of the regeneration gas to 100 wppb or less.

In some optional aspects, the internal structures of the steam cracking process train can be modified to reduce or minimize the impact of mercury in the feed. For example, after passing through the process gas driers, the vapor effluent can be further cooled using aluminum-type core exchangers to reduce the temperature to a level suitable for separation of methane and hydrogen. The use of a mercury resistant or tolerant aluminum plate fin heat exchangers can help to mitigate the failure of such heat exchangers due to mercury.

Configuration Examples

The FIGURE shows an example of a steam cracking system. In the FIGURE, a hydrocarbon feed 105 comprising mercury material and water 101 are passed into a desalter 110 to form a desalted feed 115 and a desalter sludge 117. The desalted feed 115 is then introduced into one or more convection coils located in a convection zone 122 of furnace 140 for preheating. After some pre-heating, the heated, desalted feed 125 is mixed with steam 102 and passed into a liquid vapor separator 130 to form a pyrolysis feed 135 and a bottoms stream 137. The pyrolysis feed 135 is passed back into radiant coils in furnace 120 for cracking in radiant zone 142.

After the desired degree of thermal cracking has been achieved, the steam cracking effluent 145 is cooled and fractionated in cooling and fractionation stage 150. The cooling and fractionation stage 150 can include, for example, a primary fractionator and a quench tower. Streams separated from the steam cracker effluent and conducted away from stage 150 can include, for example, a bottoms or steam cracker tar 151, a gas oil 153, and a naphtha 155, and a process fluid 157. It is noted that process fluid 157 can also include other light ends.

The process fluid is conducted via line 157, e.g., from the overhead of a quench tower, to one or more stages of a first compressor (typically a compressor train having a plurality of compression stages) in stage 160 to form a compressed process fluid. Acidic gases (acid gas, such as $H_2S$ and/or $CO_2$) are removed in removal stage 160. Acid gas removal can be performed using any convenient method, such as an amine tower and/or a caustic tower. Optionally, a polysulfide reagent 162 can be added to the acid gas removal stage to facilitate additional removal of mercury. The effluent from acid gas removal can then be compressed in a second compressor (and/or in a stage of the first compressor) to facilitate further separation of desired products, e.g., light olefin. The compressing and cooling in process gas compressor and acid gas removal stage 160 can result in generation of an additional naphtha 165, a process gas 167, and a process liquid 169.

Process gas 167 can then be passed into a process gas dryer 170. Process liquid 169 can be passed into process liquid dryer 180. In the configuration shown in the FIGURE, process gas dryer 170 and process liquid dryer 180 include a regenerable mercury removal zone, such as one or more zones containing regenerable mercury removal molecular sieve. In such an aspect, during a first time period, removal of water and mercury is performed in process gas dryer 170 to produce an upgraded process gas 175 that is suitable for further processing, such as by fractionation and/or hydroprocessing. When regeneration is needed or desired, the flow of process gas 167 can be stopped and/or diverted to a parallel process gas dryer (not shown). The flow of process gas 167 can be restored after regeneration has been substantially completed. A hot regeneration flow 171 can then be introduced into process gas dryer 170. The hot regeneration flow 171 removes mercury material and water from process gas dryer 170 and generates a mercury-containing flue gas 173. The mercury-containing flue gas 173 is passed to mercury trap 179 before further use of the cleaned flue gas 189. Similarly, removal of water and mercury is performed in process liquid dryer 180 to produce a processed flow 185 that is suitable for further processing. When regeneration is needed or desired, the flow of process liquid 169 can be stopped and/or diverted to a parallel process liquid dryer (not shown). The flow of process liquid 169 can be restored after regeneration has been substantially completed. A warm regeneration flow 181 can then be introduced into process liquid dryer 180. The warm regeneration flow 181 removes mercury and water from process liquid dryer 180 and generates mercury-containing flue gas 183. Mercury-containing flue gas flue gas 183 is also passed to mercury trap 179. It is noted that the flows of contaminated flue gas 173 and 183 may be intermittent. Therefore, it may be desirable to bypass the liquid and gas driers with an additional portion 176 of warm regeneration flow 181. This additional portion 176 can be passed into mercury trap 179 to maintain the temperature of the fixed bed, thereby minimizing or avoiding condensation of liquid (e.g., hydrocarbon liquids)/water in the fixed bed.

As an alternative, process gas dryer 170 and process gas dryer 180 can include only molecular sieve for water removal. In such an aspect, one or more mercury trap beds 179 can be placed before and/or after process gas dryer 170 and process gas dryer 180 for removal of mercury.

In the configuration shown in the FIGURE, naphtha 155 and additional naphtha 165 are combined and passed into optional mercury trap bed 190 to produce an upgraded naphtha 195 having a lesser mercury content than the combined streams. The upgraded naphtha 195 can then be further processed, such as by fractionation and/or hydroprocessing.

The various process elements shown in the FIGURE can be described as being in fluid communication for passage of feed, fractions, effluents, and/or other flows between process elements. For example, in the configuration in the FIGURE, desalter 110 is in fluid communication with furnace 140. Fluid communication can correspond to direct fluid communication or indirect fluid communication. For example, in the FIGURE, furnace 140 is shown as being in direct fluid communication with cooling and fractionation stage 150. Furnace 140 is in indirect fluid communication with process gas compressor and acid gas removal stage 160 via cooling and fractionation stage 150.

Other configurations can also be potentially suitable. For example, in certain aspects, an initial separation is carried out, such as a separation in which a first stream comprising molecular hydrogen, $C_1$-$C_2$ hydrocarbons, and some $C_{3+}$ hydrocarbons, and a second stream comprising $C_{3+}$ hydrocarbon, are separated by fractionation from the upgraded process fluid. In still other examples, the first stream can comprise methane and molecular hydrogen, and the second stream can comprise $C_{2+}$ hydrocarbon, or the first stream can comprise molecular hydrogen and $C_{3-}$ hydrocarbon, and the second stream can comprise $C_{4+}$ hydrocarbon.

After the initial separation, additional separations can be performed. As an example, an initial separator can be utilized to separate from the upgraded process gas at least (i) a stream comprising molecular hydrogen, methane and $C_2$ hydrocarbons (with some $C_{3+}$); and (ii) a stream comprising $C_{3+}$ hydrocarbon. A second fractionator can be utilized to separate from the stream comprising $C_{3+}$ hydrocarbons at least (i) a stream comprising $C_3$ hydrocarbon, and (ii) a stream comprising $C_{4+}$ hydrocarbon. A third fractionator can be utilized to separate from the stream comprising $C_{4+}$ hydrocarbon at least (i) a stream comprising $C_4$ hydrocarbon, and (ii) a stream comprising $C_{5+}$ hydrocarbon. The stream comprising $C_{5+}$ hydrocarbon can then be combined with any other naphtha boiling range product formed during steam cracking to form a pyrolysis gasoline fraction.

In such an example, the stream comprising $C_3$ hydrocarbon is typically conducted to further processing stages which may include (i) a methanol/COS removal bed, (ii) an arsine removal bed, and (iii) a methyl acetylene and propadiene (MAPD) converter for selective hydrogenation. The purified stream comprising $C_3$ hydrocarbons is then conducted to a $C_3$ splitter (e.g., a fractionator) for separation of at least propylene and propane. The propane may be recycled for further cracking or used in other refinery processes.

In such an example, the stream comprising molecular hydrogen, methane, and $C_2$ hydrocarbons (with some $C_{3+}$) can be transferred to a compressor for additional compression. From the compressor, a stream comprising compressed molecular hydrogen, methane and $C_2$ hydrocarbons (with some $C_{3+}$) can be passed to a series of purifications which may include (i) a mercaptan and carbonyl sulfide removal bed, (ii) an arsine bed, and (iii) a $C_2$ acetylene converter. The purified stream comprising molecular hydrogen, methane, ethane, ethylene, and some $C_{3+}$ can then be at least partially passed into another separator. The separator is utilized to separate, from at least a portion of the purified stream, at least (i) a first stream comprising molecular hydrogen and methane; and (ii) a second stream comprising $C_2$ hydrocarbon. This second stream can then be fractionated to separate from this second stream (i) any residual $C_{3+}$, and (ii) a stream comprising purified $C_2$ hydrocarbon. The stream comprising purified $C_2$ hydrocarbon is then passed into a $C_2$ splitter. The $C_2$ splitter is utilized to separate from the purified $C_2$ hydrocarbon at least (i) ethylene and (ii) ethane. Ethane may be recycled for further cracking or used in other refinery processes. Still other additional separations can optionally be carried out. For example, a separator can be used to separate from the tail gas stream at least (i) methane, and (ii) molecular hydrogen. At least a portion of the separated methane may be used as fuel gas and/or steam cracked again for the production of syngas and hydrogen.

Although it is not required, the invention is compatible with combining one or more of the process fluid, the process liquid, and the process gas (typically, the process fluid and/or the process gas) with one or more refinery and/or petrochemical process streams, e.g., streams derived from processes for producing one or more of fuels, lubricating oils, and petrochemicals. Doing so has been found to be efficient, especially when one or more of the indicated refinery and/or petrochemical streams contain molecular hydrogen and/or $C_2$ to $C_4$ olefin. For example, during an interval of diminished flow of process fluid, excess capacity in process fluid treatment in stage 160 and in separations located in that stage or downstream thereof can be utilized for (i) removing one or more desired products, e.g., $C_2$-$C_4$ olefin, from the refinery and/or petrochemical streams and (ii) optionally recycling any remaining portion of the refinery and/or petrochemical streams (e.g., a portion comprising saturated hydrocarbon) for cracking as steam cracker furnace feed and/or combustion in steam cracker furnace burners, burners in other furnaces, etc. The process fluid, process liquid, and/or a stream derived therefrom can be combined with one or more refinery and/or petrochemical process streams upstream and/or downstream of the compressor train. Alternatively, or in addition, one or more of the indicated streams can be combined in between one or more stages of the compressor trains.

Alternatively or in addition, at least a portion of one or more of the indicated refinery and/or petrochemical streams can be utilized directly as a steam cracker furnace burner fuel. Alternatively or in addition, at least a portion of one or more of the indicated refinery and/or petrochemical process streams can be combined with feed to the steam cracking furnace, e.g., with one or more of a hydrocarbon feed, a desalted feed, a preheated feed, and the pyrolysis feed. Advantageously, this can be carried out with little or no pretreatment of the refinery and/or petrochemical process streams.

Suitable refinery and petrochemical streams include those obtained or derived from one or more of cracking; hydroprocessing; alcohol production and/or alcohol conversion; reforming; conversion of natural gas to olefin; polymerization, including oligomerization; hydrocarbon combustion; and hydrocarbon distillation. Representative cracking processes include thermal and/or catalytic cracking, such as fluidized catalytic cracking. Representative hydroprocessing processes include catalytic and/or non-catalytic hydroprocessing, e.g., one or more of hydrotreating, hydrogenation (including hydrodearomatization), hydrodewaxing, dehydrogenation, hydrocracking, hydro-isomerization, and/or ring opening. Representative alcohol production and/or alcohol conversion processes include, e.g., catalytic and/or non-catalytic processes, such as alcohol synthesis processes (including oxo-alcohol processes) and alcohol conversion processes such as catalytic and/or non-catalytic alcohol dehydration.

In certain aspects, the process gas is combined with a light hydrocarbon product obtained from a fluidized catalytic cracking (FCC) process, e.g., a process gas derived from an FCC fractionator overhead. Suitable fluidized catalytic crackers and equipment associated therewith and processes for operating same can include those disclosed in Handbook of Petroleum Refining Processes, 2d Ed., R. A. Meyers, 3.3-3.111, McGraw-Hill, but the invention is not limited thereto. For example, a refinery stream comprising a light hydrocarbon product derived from an FCC process, such as from an FCC fractionator overhead, can be combined (not shown) with one or more of the process fluid, the process liquid, and the process gas at one or more locations in stages 150 and 160, such as by introducing the light hydrocarbon product into one or more of lines 157, 167, and 169. The location in the process at which the light hydrocarbon product is introduced may depend mainly on the types and amounts of impurities present therein. For example, besides light olefin, the light hydrocarbon product can contain one or more of molecular hydrogen, methane, ethane, propane, butanes, ammonia, carbon dioxide, arsine, mercury, hydrogen sulfide, carbonyl sulfide, mercaptans, and carbon disulfide, oxygenates and water. It is observes that mercury present in the light hydrocarbon product of an FCC process can be found in the $C_3$-$C_4$ portion of that stream and in the $C_{5+}$ portion, with a major amount of the stream's mercury content appearing in the $C_2$-$C_4$ portion.

In certain aspects, the light hydrocarbon product is pretreated before it is introduced into stages 150 and/or 160. The pretreatment can include, e.g., demethanizing the light hydrocarbon product in one or more demethanizers, to produce a tail gas and a demethanized $C_{2+}$ product. Conventional demethanizers can be used, e.g., one or more cryogenic demethanizers and/or one or more absorption demethanizers, but the invention is not limited thereto. Additional pretreatment stages can be used, e.g., for removing other non-hydrocarbon compounds from the light hydrocarbon product and/or the demethanized $C_{2+}$ product. Such additional pretreatment stages can include stages for removing at least a portion of one or more of ammonia, carbon dioxide, arsine, hydrogen sulfide, carbonyl sulfide, mercaptans, and carbon disulfide, oxygenates, and water. The pretreated light hydrocarbon product can be introduced as indicated into process gas and/or streams derived from the process gas. Although at least a portion of any mercury in the light hydrocarbon product from the FCC mercury can be removed during the pretreatment, it is typical to remove at least a portion of this mercury in mercury-removal stages located downstream of stage 160, e.g., in stage 170 and/or stage 180.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

The invention claimed is:

1. A method for performing steam cracking, comprising:
    desalting a hydrocarbon feed comprising hydrocarbon and 25 wppb or more of a first mercury material to form a desalted feed, wherein the feed comprises one or more crude oils, crude fractions, or a combination thereof;
    heating at least a portion of the desalted feed to form a preheated feed;
    separating a pyrolysis feed and a higher boiling stream from at least a portion of the preheated feed, the pyrolysis feed having a final boiling point of 760° C. or less;
    exposing at least a portion of the pyrolysis feed to steam cracking conditions to form a steam cracker effluent;
    separating at least a naphtha and a process fluid comprising $C_2$-$C_6$ olefins from the steam cracker effluent, wherein (i) the process fluid comprises a second mercury material, (ii) the naphtha comprises a third mercury material, and (iii) the second and third materials include forms of mercury produced from the first mercury material during the steam cracking;
    separating from the process fluid (i) a process gas comprising $C_2$-$C_3$ olefin and a process liquid comprising $C_4$-$C_6$ olefin-; and
    removing at least a portion of the second mercury material from at least a portion of one or more of (i) the process fluid, (ii) the process gas, and (iii) the process liquid, wherein at least a portion of the second mercury material is removed in at least one regenerable mercury removal stage, the method further comprising:
    conducting at least a portion of the process fluid, at least a portion of the process gas, or at least a portion of the process liquid as abed feed flow to the regenerable mercury removal stage;
    stopping the bed feed flow to the mercury removal stage;
    passing a regeneration gas through the mercury removal stage to form a flue gas having a mercury content of 0.1 wppm or more;
    passing the flue gas through a fixed bed mercury trap to form a reduced-mercury flue gas having a mercury content of 100 wppb or less; and
    restoring the bed feed flow to the mercury removal stage and continuing passing of at least a portion of the flue gas through the mercury trap.

2. The method of claim 1, wherein the regeneration gas comprises a stream separated from the processed fluid fraction.

3. The method of claim 1, further comprising removing from at least a portion of the naphtha at least a portion of the third mercury material, wherein (i) at least part of the removal of the third mercury material is carried out in a fixed-bed mercury trap to form a reduced-mercury naphtha, (ii) the fixed mercury trap contains a predetermined amount of mercury sorbent, and the predetermined amount of mercury sorbent is determined from the pyrolysis feed's mercury content.

4. The method of claim 1, further comprising hydroprocessing at least a portion of the naphtha, wherein (i) at least part of the hydroprocessing is carried out in at least one hydroprocessing reactor to form a reduced-mercury naphtha, (ii) the hydroprocessing reactor contains a predetermined amount of hydroprocessing catalyst, and the predetermined amount of hydroprocessing catalyst is determined from the pyrolysis feed's mercury content.

5. The method of claim 1, the method further comprising passing the at least a portion of the process fluid into an acid gas removal stage before the removal of at least a portion of the second mercury material from the process fluid.

6. The method of claim 1, wherein the hydrocarbon feed has a mercury content of 100 wppb or more.

7. The method of claim 1, wherein the desalted feed has a mercury content in a range of from 25 wppb to 500 wppb.

8. The method of claim 1, wherein the naphtha has a mercury content in a range of from 1 wppb to 100 wppb.

9. The method of claim 1, wherein the heating of the at least a portion of the desalted feed includes heating in a convection section of a steam cracking furnace, the preheated feed having a mercury content in a range of from 25 wppb to 400 wppb.

10. The method of claim 1, wherein the one or more crude oils, crude fractions, or a combination thereof comprise one or more crude oils, crude fractions, or a combination thereof that have not been processed in a co-located refinery.

11. The method of claim 1, wherein the one or more crude oils, crude fractions, or a combination thereof comprise one or more crude oils, crude fractions, or a combination thereof that have not been previously processed in a refinery.

12. The method of claim 1, wherein the one or more crude oils, crude fractions, or a combination thereof comprise one or more raw crude oils, crude fractions, or a combination thereof.

13. The method of claim 1, wherein the pyrolysis feed has a final boiling point of 593° C. or less and/or the pyrolysis feed comprises 400 wppm or less of non-volatiles.

14. The method of claim 1, further comprising separating at least one of a steam cracker gas oil fraction and a steam cracker tar fraction from the steam cracking effluent.

15. The method of claim 1, wherein the hydrocarbon feed comprises 70 wt. % or more of components having a boiling point of 150° C. or more.

16. The method of claim 1, wherein at least a portion of the second mercury material is separated from the process fluid to produce an upgraded process fluid having a mercury content of 0.1 wppb or less.

17. The method of claim 1, wherein the removing at least a portion of the second mercury material includes i) exposing the process gas to a mercury removal stage that includes at least one process gas drier, ii) exposing the process liquid to a mercury removal stage comprising a process liquid drier, or iii) a combination of i) and ii).

18. A steam cracking reaction system, comprising:
    a desalter;
    a steam cracking furnace comprising a convection zone inlet, a convection zone outlet, a radiant zone inlet, and a radiant zone outlet, the desalter being in fluid communication with the convection zone inlet;
    a vapor-liquid separator in fluid communication with the convection zone outlet and the radiant zone inlet;
    a cooling and fractionation stage in fluid communication with the radiant zone outlet, the cooling and fractionation stage comprising a naphtha outlet and a process fluid outlet;
    a compressor and acid gas removal stage in fluid communication with the process fluid outlet;
    one or more drying stages in fluid communication with the compressor and acid gas removal stage; and at least one fixed bed mercury trap in fluid communication with the one or more drying stages.

19. The system of claim 18, wherein the one or more drying stages comprise a regenerable mercury removal molecular sieve.

20. The system of claim 18, wherein compressor and acid gas removal stage is further in fluid communication with a source of a polysulfide reagent, a source of elemental sulfur, or a combination thereof.

21. The system of claim 18, further comprising a fixed bed mercury trap in fluid communication with the naphtha outlet.

22. The system of claim 18, wherein the one or more drying stages comprise at least one process gas drier and at least one process liquid drier.

23. A steam cracking process, comprising:
providing a hydrocarbon feed comprising hydrocarbon and mercury material, wherein the mercury is present in an amount $A_1$ based on the weight of the hydrocarbon feed;
determining $A_1$;
establishing a flow of the hydrocarbon feed into a steam cracking furnace facility to produce a steam cracker effluent;
separating from the steam cracker effluent a naphtha comprising $C_{5+}$ hydrocarbon and mercury;
upgrading the naphtha, wherein
  (i) the upgrading includes both mercury removal and hydroprocessing of the naphtha,
  (ii) the mercury removal and hydroprocessing are carried out in at least one hydroprocessing reactor containing a predetermined first amount ($A_2$) of a first active material and a predetermined amount ($A_3$) of a second active material,
  (iii) $A_2$ is effective for the mercury removal,
  (iv) $A_3$ is effective for the hydroprocessing, and
  (v) $A_2$ and $A_3$ are determined from $A_1$.

24. The process of claim 23, wherein the first and second active materials have the same or different compositions.

25. The process of claim 23, wherein the first and second active materials have different compositions, and first active material is located upstream of the second active material.

26. The process of claim 23, wherein at least a portion of the naphtha's mercury is removed before the hydroprocessing.

27. The process of claim 23, further comprising substituting a second hydrocarbon feed for at least a portion of the first hydrocarbon feed.

28. The process of claim 27, wherein the first and second feeds are each a raw crude oil.

29. A method for performing steam cracking, comprising:
desalting a hydrocarbon feed comprising hydrocarbon and 25 wppb or more of a first mercury material to form a desalted feed, wherein the feed comprises one or more crude oils, crude fractions, or a combination thereof;
heating at least a portion of the desalted feed to form a preheated feed;
separating a pyrolysis feed and a higher boiling stream from at least a portion of the preheated feed, the pyrolysis feed having a final boiling point of 760° C. or less;
exposing at least a portion of the pyrolysis feed to steam cracking conditions to form a steam cracker effluent;
separating at least a naphtha and a process fluid comprising $C_2$-$C_6$ olefins from the steam cracker effluent, wherein (i) the process fluid comprises a second mercury material, (ii) the naphtha comprises a third mercury material, and (iii) the second and third materials include forms of mercury produced from the first mercury material during the steam cracking;
separating from the process fluid (i) a process gas comprising $C_2$-$C_3$ olefin and a process liquid comprising $C_4$-$C_6$ olefin; and
removing at least a portion of the second mercury material from at least a portion of one or more of (i) the process fluid, (ii) the process gas, and (iii) the process liquid, wherein
  a) the method further comprises passing the at least a portion of the process fluid into an acid gas removal stage before the removal of at least a portion of the second mercury material from the process fluid,
  b) the removing at least a portion of the second mercury material includes exposing the process gas to a mercury removal stage that includes at least one process gas drier,
  c) the removing at least a portion of the second mercury material includes exposing the process liquid to a mercury removal stage comprising a process liquid drier, or
  d) a combination of two or more of a), b), and c).

30. The method of claim 29, wherein mercury sulfide is removed from that portion of the process fluid in the acid gas removal stage, the mercury sulfide being produced by contacting that portion of the process fluid with a polysulfide reagent, and wherein the mercury sulfide is removed at a location upstream of the mercury removal stage.

* * * * *